(12) United States Patent
Hsu et al.

(10) Patent No.: US 7,397,294 B2
(45) Date of Patent: Jul. 8, 2008

(54) CHARGE PUMP CLOCK GENERATING CIRCUIT AND METHOD THEREOF

(75) Inventors: Liang-Kuei Hsu, Chiayi County (TW); Chang-San Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 65 days.

(21) Appl. No.: 11/559,413

(22) Filed: Nov. 14, 2006

(65) Prior Publication Data
US 2008/0042717 A1    Feb. 21, 2008

(30) Foreign Application Priority Data
Aug. 16, 2006  (TW) ............... 95130045 A (51) Int. Cl.
    *G06F 1/04*      (2006.01)
(52) U.S. Cl. ....................... 327/291; 327/298
(58) Field of Classification Search ........... None
    See application file for complete search history.

(56) References Cited
U.S. PATENT DOCUMENTS

| | | | | |
|---|---|---|---|---|
| 5,689,436 A * | 11/1997 | Takeuchi | ............... | 375/240.01 |
| 5,838,311 A * | 11/1998 | Hayano et al. | ............... | 345/213 |
| 5,929,711 A * | 7/1999 | Ito | ............... | 331/1 A |
| 6,020,879 A * | 2/2000 | Nakabayashi | ............... | 345/212 |
| 6,356,314 B1 * | 3/2002 | Takebe | ............... | 348/564 |
| 6,750,693 B1 * | 6/2004 | Duewer | ............... | 327/298 |
| 6,822,645 B2 * | 11/2004 | Noritake et al. | ............... | 345/211 |
| 7,106,118 B2 * | 9/2006 | Tang et al. | ............... | 327/291 |
| 2006/0132418 A1 * | 6/2006 | Morita | ............... | 345/98 |

* cited by examiner

*Primary Examiner*—Cassandra Cox
(74) *Attorney, Agent, or Firm*—Jianq Chyun IP Office (57) ABSTRACT

A charge pump clock generating circuit and a method thereof are disclosed. The circuit includes a sync counter, a comparator, and a clock generating circuit. The sync counter receives a dot clock and a reset signal for accumulating a counting value according to the dot clock and resetting the counting value to a starting value when the reset signal is enabled. The comparator receives the counting value and outputs the reset signal when the counting value is greater than or equal to a preset value. The clock generating circuit receives a display clock and the reset signal and outputs a charge pump clock. The clock generating circuit transforms the logic state of the charge pump clock when the reset signal is enabled, and sets the charge pump clock to a first preset logic state when the display clock is transformed from a first state to a second state.

18 Claims, 6 Drawing Sheets

CHARGE PUMP CLOCK GENERATING CIRCUIT AND METHOD THEREOF

CROSS-REFERENCE TO RELATED APPLICATION

This application claims the priority benefit of Taiwan application serial no. 95130045, filed Aug. 16, 2006. All disclosure of the Taiwan application is incorporated herein by reference.

BACKGROUND OF THE INVENTION

1. Field of the Invention

The present invention relates to a clock generating circuit. More particularly, the present invention relates to a charge pump clock generating circuit and a method thereof in a display.

2. Description of Related Art

In a display driving circuit, for example, the source driver or gate driver in a liquid crystal display, a charge pump circuit is required for generating a non-rated supply voltage which is required by the driving circuit.

Generally speaking, a charge pump needs to receive a clock signal to provide the charge. Taking a source driver as an example, the source driver has two clock signals, one is a dot clock signal and the other one is a horizontal sync signal. The dot clock signal cannot be used by a typical charge pump for the frequency of the dot clock signal is between 10 MHz and a few hundreds MHz and the power devices in the charge pump cannot operate at such high frequency. Besides, if the charge pump is designed to be able to operate at such a high frequency, the dynamic power consumption of the charge pump may be too high.

Figure 1:
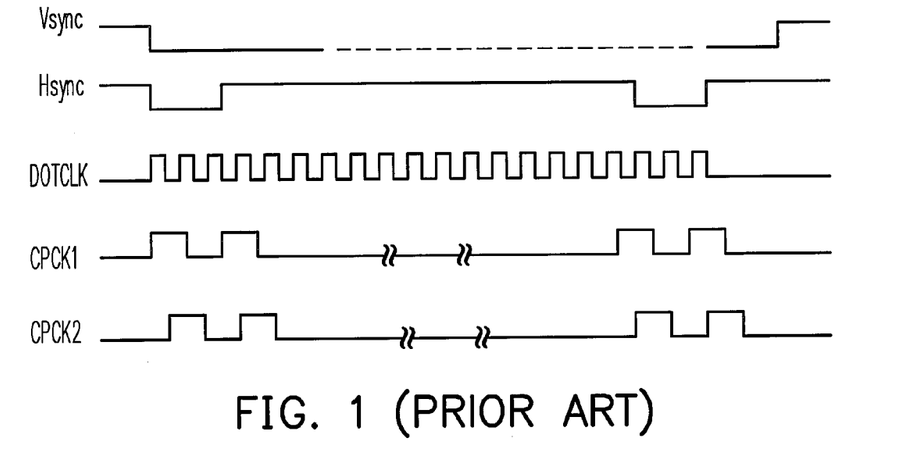
FIG. 1 illustrates the clock diagrams of a conventional charge pump clock signal, a horizontal sync signal, a vertical sync signal, and a dot clock signal.

Generally, a conventional charge pump clock generating circuit generates the clock by divided the frequency of the dot clock through directly sending the dot clock to a frequency divider. FIG. 1 illustrates the clock diagrams of a conventional charge pump clock signal, a horizontal sync signal, a vertical sync signal, and a dot clock signal. In FIG. 1, Hsync represents a horizontal sync signal, Vsync represents a vertical sync signal, DOTCLK represents a dot clock signal, and CPCK1 and CPCK2 represent the charge pump clock signal respectively. In FIG. 1, the charge pump clock signal CPCK1 or CPCK2 do not align with the horizontal sync signal, and which seems not affecting the charge pump. However, a charge pump always produces noises in a driving circuit and accordingly wavy noises are generated on the display. Such noises are caused by the asynchrony between the charge pump clock signal and the horizontal and vertical sync signals.

Accordingly, a charge pump clock generating device is required so that the noises produced by the charge pump can fall evenly within every display sync signal such as the horizontal sync signal.

SUMMARY OF THE INVENTION

Accordingly, the present invention is directed to a charge pump clock generating circuit which allows the noises produced by a charge pump to fall evenly within every display sync signal, and so that the performance of the display is improved.

According to another aspect of the present invention, a charge pump clock generating method is provided wherein the problems of the noises produced by the charge pump interfering with display images in conventional technique may be resolved, so that the performance of the display can be improved.

The present invention provides a charge pump clock generating circuit including a first sync counter, a first comparator, and a clock generating circuit. The first sync counter receives a dot clock and a reset signal for accumulating a first counting value according to the dot clock and resetting the first counting value to a first starting value when the reset signal is enabled. The first comparator receives the first counting value and outputs the reset signal, and the first comparator enables the reset signal when the first counting value is greater than or equal to a first preset value. The clock generating circuit receives a display clock and the reset signal, and outputs the charge pump clock. When the reset signal is enabled, the clock generating circuit transforms the logic state of the charge pump clock, and when the display clock is transformed from a first state to a second state, the clock generating circuit sets the charge pump clock to a first preset logic state.

According to a charge pump clock generating circuit in an exemplary embodiment of the present invention, the sync counter further receives the aforementioned display clock.

According to an exemplary embodiment of the present invention, the charge pump clock generating circuit further includes a display cycle detecting circuit and a pulse width calculating circuit. The display cycle detecting circuit receives the dot clock and the display clock for calculating the pulse number of the dot clock within a display clock period as a pulse value. The pulse width calculating circuit receives the pulse value for calculating the preset value by dividing the pulse value with a frequency-dividing value.

According to an exemplary embodiment of the present invention, the charge pump clock generating circuit further includes a counter cleanup control circuit which receives the reset signal and outputs a charge pump clock reset signal when the number of enabled times of the reset signal is greater than or equal to a cleanup control value.

The present invention provides a charge pump clock generating method which includes following steps. A display clock is received. The first counting value is accumulated when the display clock is enabled. The first counting value is reset to a first starting value and the logic state of the charge pump clock is transformed when the first counting value is greater than or equal to a first preset value. The charge pump clock is set to a first preset logic state when the display clock is transformed from a first state to a second state.

According to an exemplary embodiment of the present invention, the step of resetting the first counting value to a first starting value and transforming the logic state of the charge pump clock when the first counting value is greater than or equal to the first preset value includes: providing a reset signal; enabling the reset signal when the first counting value being greater than or equal to a first preset value; resetting the counting value to a first starting value and transforming the logic state of the charge pump clock when the reset signal being enabled.

According to an exemplary embodiment of the present invention, the display clock is a horizontal sync signal, and the first starting value and the second starting value are 0.

According to the present invention, a digital logic circuit is adopted to synchronize a charge pump clock and a horizontal cycle signal, so that the noises produced by a charge pump can fall evenly within every display sync signal, and accordingly the display performance of the display can be further improved.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In conventional techniques, the asynchrony between a charge pump clock and a display clock may cause display defects in a display, thus, the present invention provides a charge pump clock generating circuit which allows the noises produced by the charge pump to fall evenly within every display clock signal so that the display performance of the display is further improved.

Figure 2:
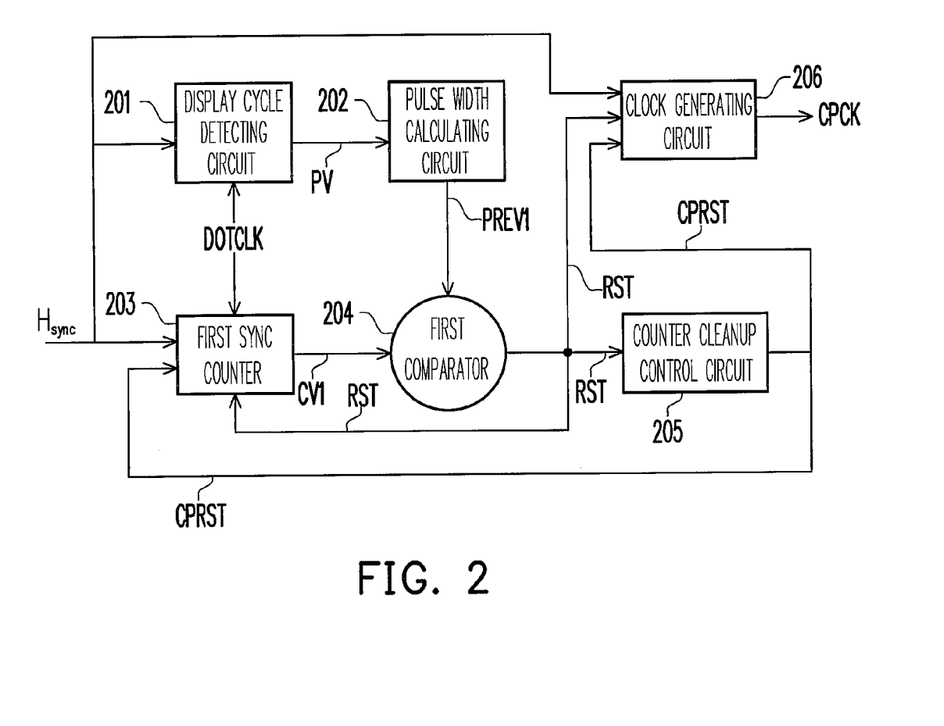
FIG. 2 is a block diagram of a charge pump clock generating circuit according to an embodiment of the present invention.

FIG. 2 is a block diagram of a charge pump clock generating circuit according to an embodiment of the present invention. The circuit includes a display cycle detecting circuit 201, a pulse width calculating circuit 202, a first sync counter 203, a first comparator 204, a counter cleanup control circuit 205, and a clock generating circuit 206.

The first sync counter 203 receives a charge pump clock reset signal CPRST, a display clock Hsync (here a horizontal sync clock is used as an example of the display clock), a dot clock DOTCLK, and a reset signal RST for accumulating a first counting value CV1 according to the dot clock DOTCLK and resetting the first counting value CV1 to a first starting value (here, as an example, the first starting value has value 0) when the reset signal RST is enabled. When the charge pump clock reset signal CPRST is enabled, the first counting value CV1 is reset to the first starting value and the accumulation of the first counting value CV1 is stopped. The display cycle detecting circuit 201 receives the dot clock DOTCLK and the display clock Hsync for calculating the pulse number of the dot clock DOTCLK within a display clock Hsync period as a pulse value PV.

The pulse width calculating circuit 202 receives the pulse value PV for calculating a first preset value PREV1 by dividing the pulse value PV with a frequency-dividing value n. The comparator 204 receives the first counting value CV1 and the first preset value PREV1 and outputs the reset signal RST. The comparator 204 enables the reset signal RST when the first counting value CV1 is greater than or equal to the first preset value PREV1. The counter cleanup control circuit 205 receives the reset signal RST and outputs a charge pump clock reset signal CPRST when the number of enabled times of the reset signal RST is greater than or equal to a second preset value PREV2. The clock generating circuit 206 receives the charge pump clock reset signal CPRST, the display clock Hsync, and the reset signal RST, and outputs a charge pump clock CPCK. The clock generating circuit 206 transforms the logic state of the charge pump clock CPCK when the reset signal RST is enabled and sets the charge pump clock CPCK to a first preset logic state when the display clock Hsync is transformed from a first state to a second state.

Figure 3:
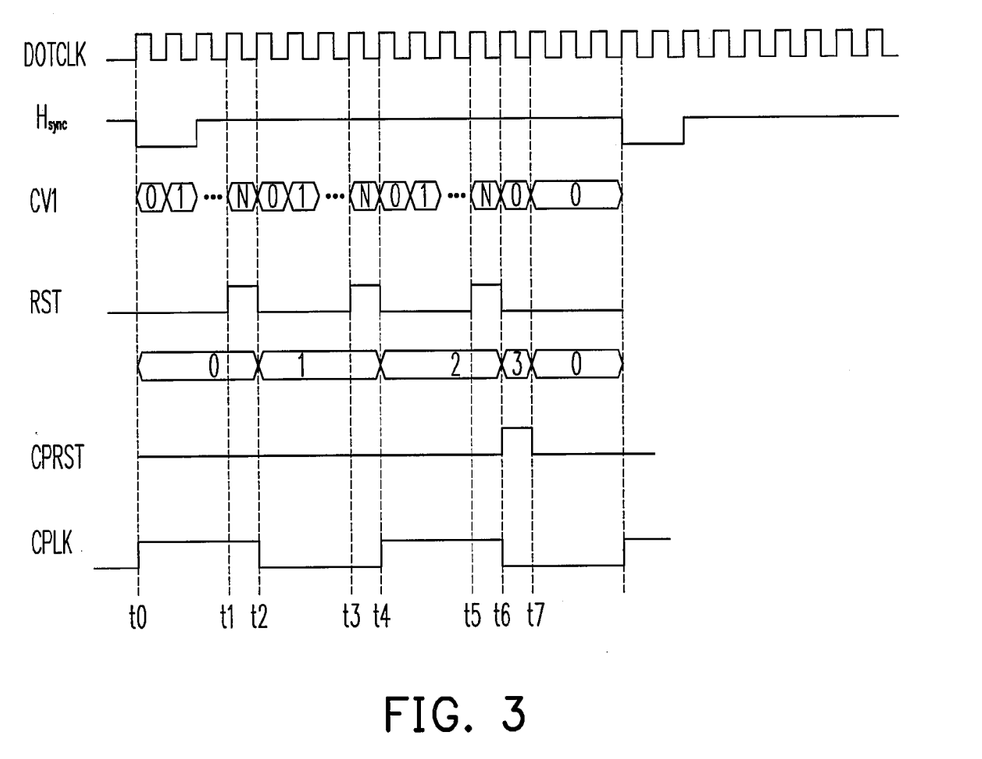
FIG. 3 is a timing diagram of the charge pump clock generating circuit in FIG. 2.

FIG. 3 is a timing diagram of the charge pump clock generating circuit in FIG. 2. Referring to FIG. 2 and FIG. 3, it is assumed here that the pulse value PV in the horizontal sync clock calculated by the display cycle detecting circuit 201 is 4N+K, wherein N and K are natural numbers and K is smaller than N. Besides, it is assumed that the frequency-dividing value n is 4, thus, the first preset value calculated by the pulse width calculating circuit 202 is N, and the second preset value is designed to be 4−1=3. First, the first sync counter 203 starts counting at t0. When the first counting value CV1 of the first sync counter 203 reaches N (t1, t3, t5), the comparator 204 receives the first counting value CV1 and the first preset value N and enables the reset signal RST after comparing the two values. The first sync counter 203 sets the first counting value CV1 to 0 (t2, t4, t6) when the first sync counter 203 receives the enabled reset signal RST.

When the display clock Hsync received by the clock generating circuit 206 is transformed from logic high level to logic low level (t0), the clock generating circuit 206 is negative edge triggered so that the charge pump clock CPCK is set to high voltage level. When the reset signal RST is enabled (t2, t4, t6), the clock generating circuit 206 is negative edge triggered so that the logic state of the charge pump clock CPCK is transformed. When the reset signal RST is enabled 3 times (t6), which means 3N pulses of the dot clock DOTCLK have been passed within the display clock Hsync, the counter cleanup control circuit 205 enables the charge pump clock reset signal CPRST. When the charge pump clock reset signal CPRST is enabled, the first sync counter 203 keeps the first counting value CV1=0, and the clock generating circuit 206 sets the charge pump clock CPCK to a logic low voltage level until next display clock Hsync is received.

Figure 4:
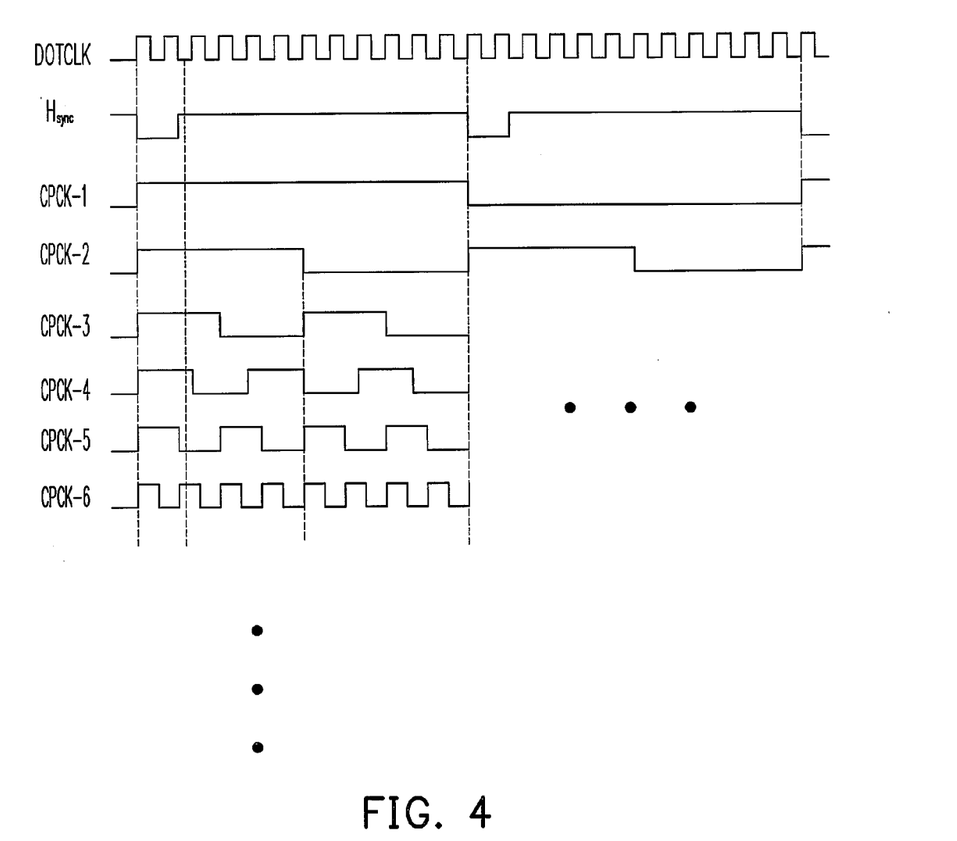
FIG. 4 illustrates the charge pump clock generating circuit in FIG. 2 with some modified parameters.

According to the embodiment described above, the charge pump clock and the horizontal cycle signal are synchronized so that the noises produced by the charge pump fall evenly within every display clock (for example, the horizontal sync signal) and the noise brightness of every horizontal line is the same, and accordingly the display performance of the display is improved. Moreover, a display clock Hsync having two charge pump clocks CPCK is used as example in the embodiment described above, however, it should be understood by those skilled in the art that the design parameters (for example, the frequency-dividing value, the second preset value, etc.) can be adjusted according to different requirement to generate 0, 1, 2, 3, 4, 8 . . . charge pump clocks CPCK-1~CPCK-6 as shown in FIG. 4.

Figure 5:
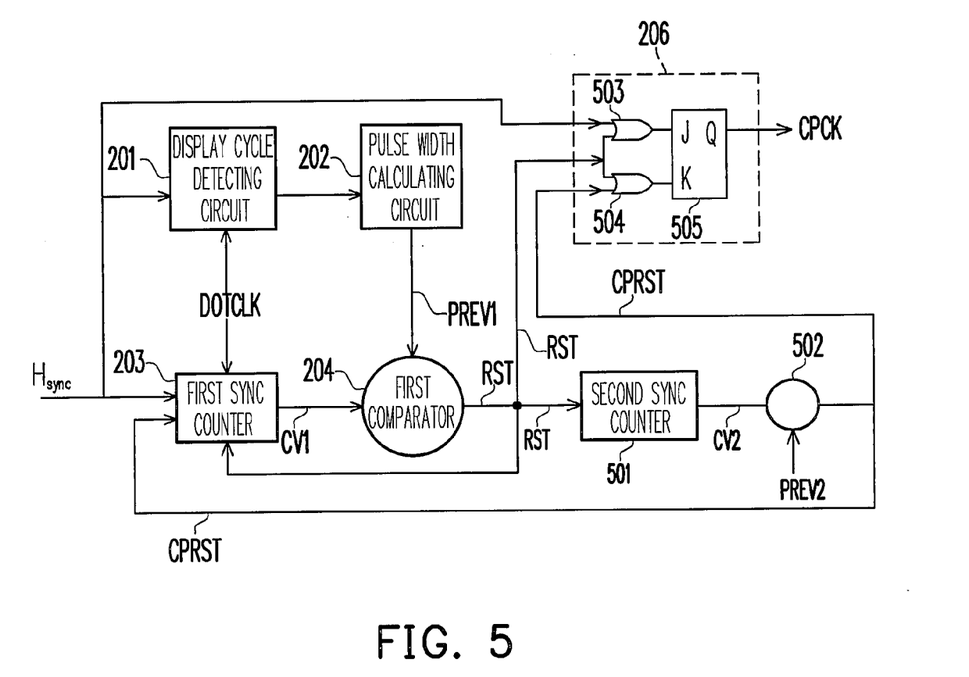
FIG. 5 is a more detailed circuit diagram of the charge pump clock generating circuit in FIG. 2.

FIG. 5 is a more detailed circuit diagram of the charge pump clock generating circuit in FIG. 2. In the present embodiment, the logic circuits of the counter cleanup control circuit 205 and the clock generating circuit 206 are further described. The counter cleanup control circuit 205 includes a second sync counter 501 and a second comparator 502. The second sync counter 501 receives the reset signal RST and the charge pump clock reset signal CPRST and accumulates a second counting value CV2 according to the reset signal RST. The second sync counter 501 resets the counting value CV2 to a second starting value (for example, 0) when the charge pump clock reset signal CPRST is enabled. The second comparator 502 receives the second counting value CV2. The second comparator 502 outputs the charge pump clock reset signal CPRST when the second counting value CV2 is greater than or equal to the second preset value PREV2 (for example, 3 as in foregoing embodiment).

The clock generating circuit 206 includes a first OR gate 503, a second OR gate 504, and a JK flip-flop 505. The first OR gate 503 receives the display clock Hsync and the reset signal RST. The second OR gate 504 receives the reset signal RST and the charge pump clock reset signal CPRST. The J input terminal of the JK flip-flop 505 is coupled to the output terminal of the first OR gate 503. The K input terminal of the JK flip-flop 505 is coupled to the output terminal of the second OR gate 504. The Q output terminal of the JK flip-flop 505 outputs the charge pump clock CPCK.

Figure 6:
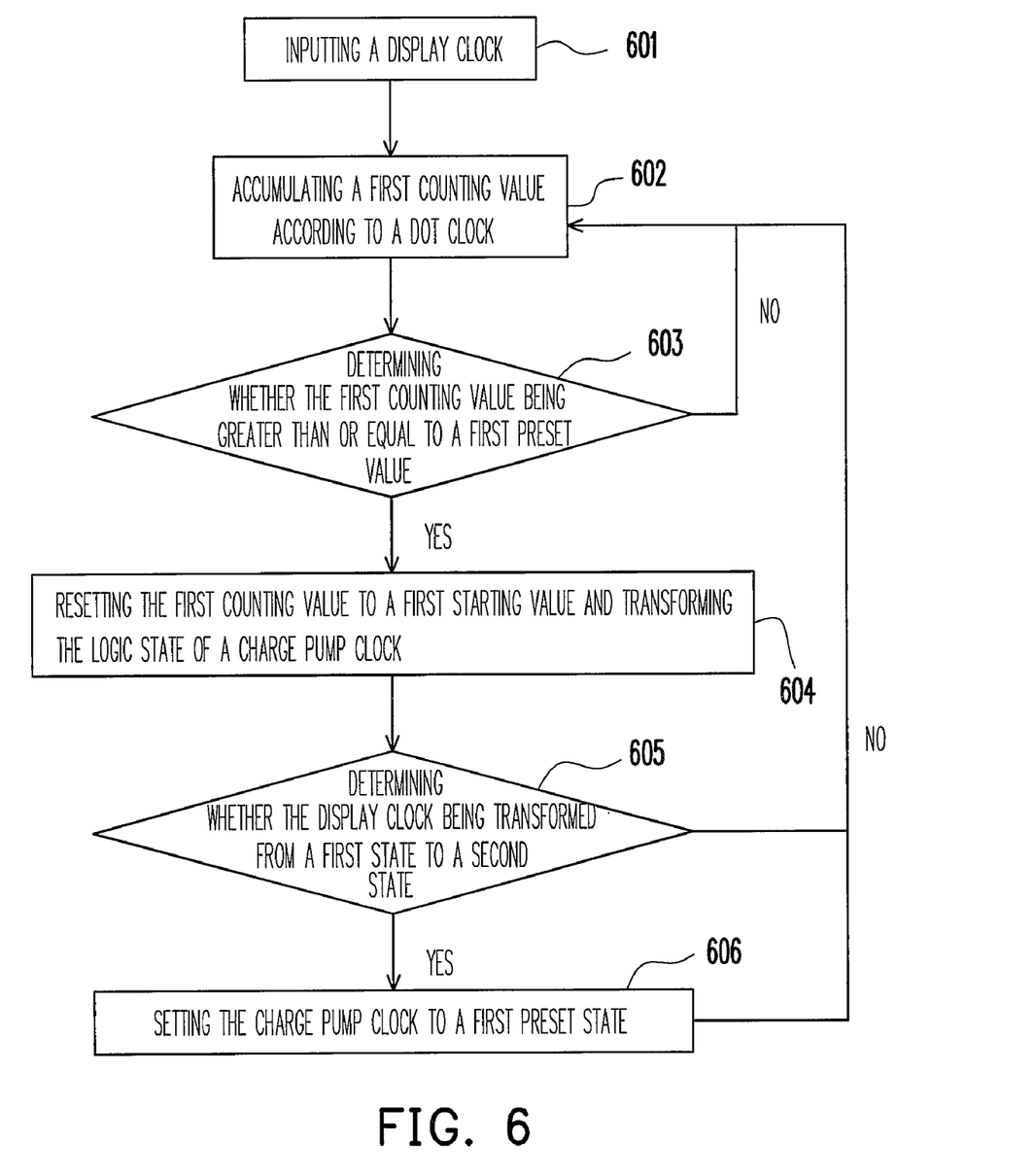
FIG. 6 is a flowchart illustrating a charge pump clock generating method according to an embodiment of the present invention.

An embodiment of the charge pump clock generating circuit has been described above, and a charge pump clock generating method will be described below. FIG. 6 is a flowchart illustrating a charge pump clock generating method according to an embodiment of the present invention. Referring to FIG. 6, first, a display clock, for example a horizontal sync signal Hsync, is received (step 601). A first counting value is accumulated according to the dot clock when the display clock Hsync is enabled (step 602). Next, whether the first counting value is greater than or equal to a first preset value is determined (step 603). If the first counting value is determined smaller than the first preset value, step 602 is returned to continue counting, otherwise the first counting value is reset to a first starting value (for example 0) and the logic state of the charge pump clock is transformed (step 604). After that whether the display clock is transformed from a first state to a second state is determined (step 605). If so, the charge pump clock is set to a first preset logic state so as in foregoing embodiment, the charge pump clock is set to logic low level (step 606).

Figure 7:
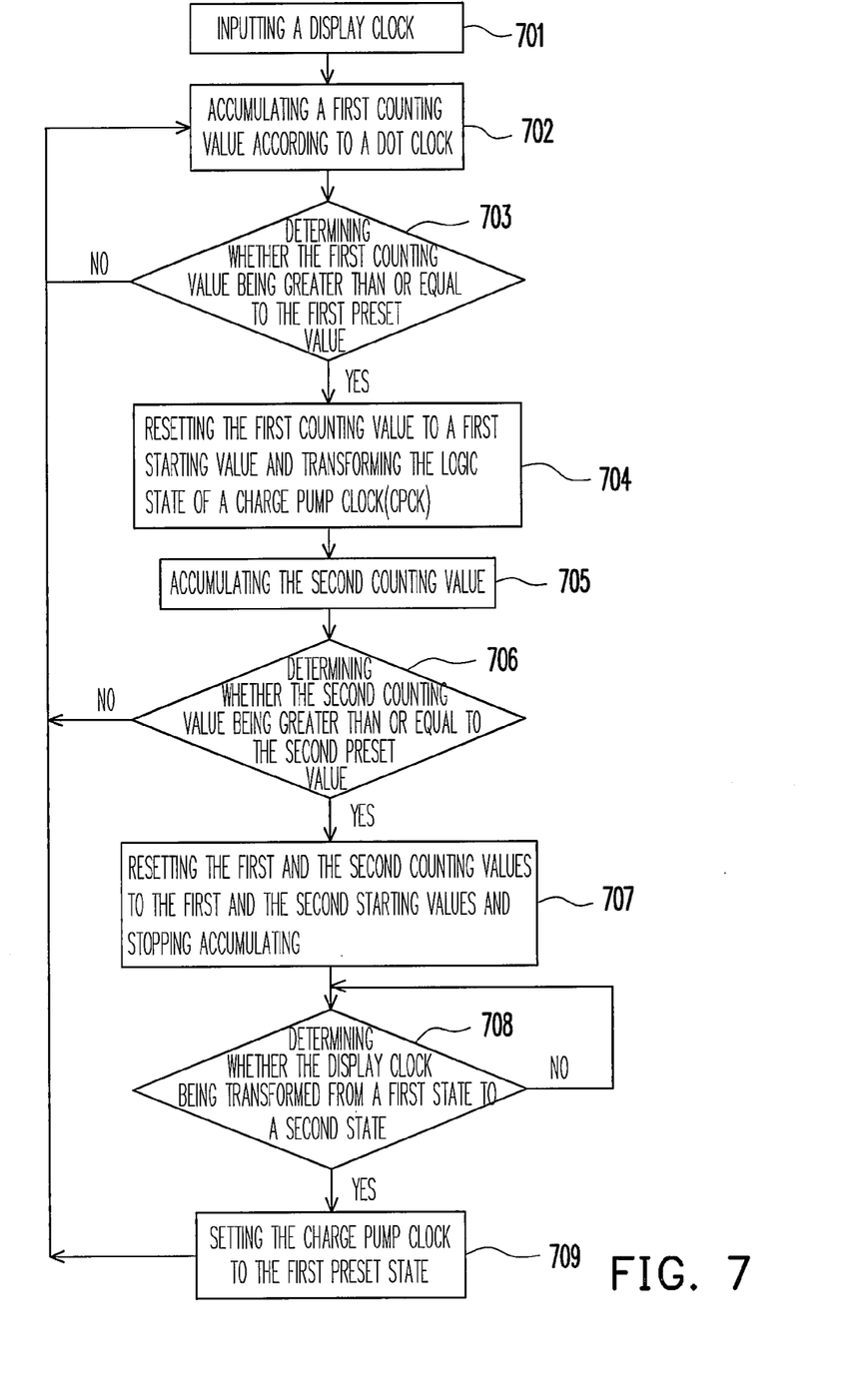
FIG. 7 is a flowchart illustrating a charge pump clock generating method according to another embodiment of the present invention.

FIG. 7 is a flowchart illustrating a charge pump clock generating method according to another embodiment of the present invention. Referring to FIG. 7, first a horizontal cycle signal is input (step 701). Next, a first counting value is accumulated according to the dot clock (step 702). After that, whether the first counting value is greater than or equal to a first preset value is determined (step 703). If the first counting value is determined smaller than the first preset value, step 702 is returned to continue counting, otherwise the first counting value is reset to a first starting value, for example 0, the logic state of the charge pump clock is transformed, and the reset signal RST is enabled (step 704). Next, the number of enabled times of the reset signal RST is recorded as a second counting value (step 705).

Next, whether the second counting value is greater than or equal to the second preset value is determined (step 706). If so, the first and the second counting values are reset to the first and the second starting values (for example, 0) and the counting is stopped. Next, whether the display clock Hsync is transformed from a first state to a second state is determined (step 708). If so, the charge pump clock CPCK is set to a first preset logic state (step 709) and returns to step 702.

In summary, in the present invention, a digital logic circuit is adopted for synchronizing a charge pump clock and a horizontal cycle signal so that the noises produced by the charge pump can fall evenly within every display sync signal, and accordingly the display performance of the display can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A charge pump clock generating circuit, comprising:
   a first sync counter, receiving a dot clock and a reset signal, accumulating a first counting value according to the dot clock, resetting the first counting value to a first starting value when the reset signal being enabled;
   a first comparator, receiving the first counting value, outputting the reset signal, enabling the reset signal when the first counting value being greater than or equal to a first preset value; and
   a clock generating circuit, receiving a display clock and the reset signal, outputting a charge pump clock, transforming the logic state of the charge pump clock when the reset signal being enabled, setting the charge pump clock to a first preset logic state when the display clock being transformed from a first state to a second state.

2. The charge pump clock generating circuit as claimed in claim 1, wherein the first sync counter further receives the display clock.

3. The charge pump clock generating circuit as claimed in claim 1, further comprising a display cycle detecting circuit receiving the dot clock and the display clock for calculating a pulse number of the dot clock within the display clock period as a pulse value.

4. The charge pump clock generating circuit as claimed in claim 3, further comprising a pulse width calculation circuit receiving the pulse value for calculating the first preset value by dividing the pulse value with a frequency-dividing value.

5. The charge pump clock generating circuit as claimed in claim 1, further comprising a counter cleanup control circuit receiving the reset signal, outputting a charge pump clock reset signal, and enabling the charge pump clock reset signal when the number of enabled times of the reset signal being greater than or equal to a second preset value.

6. The charge pump clock generating circuit as claimed in claim 5, wherein the first sync counter further receives the charge pump clock reset signal, and when the charge pump clock reset signal is enabled, the first sync counter resets the first counting value to a first starting value and stops accumulating the first counting value.

7. The charge pump clock generating circuit as claimed in claim 5, wherein the clock generating circuit further receives the charge pump clock reset signal, and sets the charge pump clock to a second preset logic state when the reset signal is enabled, wherein the second preset logic state and the first preset logic state are exclusive.

8. The charge pump clock generating circuit as claimed in claim 5, wherein the counter cleanup control circuit comprises:
   a second sync counter, receiving the reset signal and the charge pump clock reset signal for accumulating a second counting value according to the reset signal and resetting the second counting value to a second starting value when the charge pump clock reset signal being enabled; and
   a second comparator, receiving the counting value, outputting the charge pump clock reset signal when the second counting value being greater than or equal to the second present value.

9. The charge pump clock generating circuit as claimed in claim 5, wherein the clock generating circuit comprises:
- a first OR gate, having a first input terminal receiving the display clock, a second input terminal receiving the reset signal, and an output terminal;
- a second OR gate, having a first input terminal receiving the reset signal, a second input terminal receiving the charge pump clock reset signal, and an output terminal; and
- a JK flip-flop, having a J input terminal coupled to the output terminal of the first OR gate, a K input terminal coupled to the output terminal of the second OR gate, and a Q output terminal outputting the charge pump clock.

10. The charge pump clock generating circuit as claimed in claim 1, wherein the display clock is a horizontal sync signal.

11. The charge pump clock generating circuit as claimed in claim 1, wherein the first starting value is 0.

12. The charge pump clock generating circuit as claimed in claim 8, wherein the second starting value is 0.

13. A charge pump clock generating method, comprising:
- receiving a display clock;
- accumulating a first counting value according to a dot clock when the display clock being enabled;
- resetting the first counting value to a first starting value and transforming the logic state of the charge pump clock when the first counting value being greater than or equal to a first preset value; and
- setting the charge pump clock to a first preset logic state when the display clock being transformed from a first state to a second state.

14. The charge pump clock generating method as claimed in claim 13, wherein the counting value is reset to a first starting value when the first counting value is greater than or equal to a first preset value, the step of transforming the logic state of the charge pump clock comprising:
- providing a reset signal;
- enabling the reset signal when the first counting value being greater than or equal to a first preset value; and
- setting the first counting value to a first starting value and transforming the logic state of the charge pump clock when the reset signal being enabled.

15. The charge pump clock generating method as claimed in claim 14, further comprising:
- providing a second counting value for representing the number of enabled times of the reset signal; and
- setting the second counting value to a second starting value, setting the first counting value to a first starting value, and stopping counting the first and the second counting values when the second counting value being greater than or equal to a second preset value.

16. The charge pump clock generating method as claimed in claim 13, wherein the display clock is a horizontal sync signal.

17. The charge pump clock generating method as claimed in claim 13, wherein the first starting value is 0.

18. The charge pump clock generating method as claimed in claim 13, wherein the second starting value is 0.

* * * * *